(12) United States Patent
Fiske

(10) Patent No.: US 11,989,727 B2
(45) Date of Patent: May 21, 2024

(54) PAYMENT SYSTEM

(71) Applicant: VISA EUROPE LIMITED, London (GB)

(72) Inventor: Stuart Fiske, Guildford (GB)

(73) Assignee: VISA EUROPE LIMITED, London (GB)

( * ) Notice: Subject to any disclaimer, the term of this patent is extended or adjusted under 35 U.S.C. 154(b) by 0 days.

(21) Appl. No.: 18/320,103

(22) Filed: May 18, 2023

(65) Prior Publication Data

US 2023/0306419 A1  Sep. 28, 2023

Related U.S. Application Data

(60) Continuation of application No. 17/358,837, filed on Jun. 25, 2021, now Pat. No. 11,694,199, which is a
(Continued)

(30) Foreign Application Priority Data

Apr. 5, 2011 (GB) ..................................... 1105765

(51) Int. Cl.
*G06K 5/00* (2006.01)
*G06Q 20/32* (2012.01)
(Continued)

(52) U.S. Cl.
CPC ....... *G06Q 20/3829* (2013.01); *G06Q 20/322* (2013.01); *G06Q 20/3278* (2013.01);
(Continued)

(58) Field of Classification Search
CPC ............. G06Q 20/3829; G06Q 20/322; G06Q 20/3278; G06Q 20/3263; G06Q 20/3265;
(Continued)

(56) References Cited

U.S. PATENT DOCUMENTS 4,661,658 A   4/1987  Matyas
5,301,231 A   4/1994  Abraham et al.
(Continued)

FOREIGN PATENT DOCUMENTS

CN   101515319   8/2009
CN   102096972   6/2011
(Continued)

OTHER PUBLICATIONS

U.S. Appl. No. 17/069,555 , "Supplemental Notice of Allowability", dated Nov. 8, 2023, 2 pages.
(Continued)

*Primary Examiner* — Patrick McAtee
*Assistant Examiner* — Nakia Leffall-Allen
(74) *Attorney, Agent, or Firm* — Kilpatrick Townsend & Stockton LLP

(57) ABSTRACT

Methods, apparatus and computer software are provided for authorizing an EMV transaction between a user device and a point of sale terminal, particularly, but not exclusively, in situations where a secure element is not made available for the deployment of a payment application on the user device. The payment application is instead deployed to a processing environment that is outside of any secure element on the user device. An ICC Master Key corresponding to the payment application is held by a trusted authority, such as the issuing bank. The trusted authority is adapted generate time-limited session keys on the basis of the ICC Master Key and distribute session keys to the payment application. Receipt of a session key by the payment application enables the payment application to conduct an EMV payment transaction. The session key is used to authorize a single EMV payment transaction.

20 Claims, 7 Drawing Sheets

Related U.S. Application Data division of application No. 14/046,828, filed on Oct. 4, 2013, now Pat. No. 11,080,693, which is a continuation of application No. PCT/GB2012/050737, filed on Apr. 2, 2012.

(51) Int. Cl.
  *G06Q 20/38* (2012.01)
  *G07F 7/12* (2006.01)
  *H04L 9/08* (2006.01)
  *H04L 9/32* (2006.01)

(52) U.S. Cl.
  CPC .............. *G07F 7/127* (2013.01); *H04L 9/083* (2013.01); *H04L 9/3263* (2013.01); *H04L 2209/56* (2013.01)

(58) Field of Classification Search
  CPC ......... G07F 7/127; G07F 7/122; H04L 9/083; H04L 9/3263; H04L 2209/56
  See application file for complete search history.

(56) References Cited

U.S. PATENT DOCUMENTS

| | | | |
|---|---|---|---|
| 5,548,282 A | 8/1996 | Escritt et al. | |
| 5,892,900 A | 4/1999 | Ginter et al. | |
| 6,367,011 B1* | 4/2002 | Lee | G06F 21/77 380/255 |
| 6,658,566 B1 | 12/2003 | Hazard | |
| 6,658,568 B1 | 12/2003 | Ginter et al. | |
| 6,725,371 B1 | 4/2004 | Verhoorn, III et al. | |
| 6,742,116 B1 | 5/2004 | Matsui et al. | |
| 7,024,553 B1 | 4/2006 | Morimoto | |
| 7,080,256 B1 | 7/2006 | Vedder | |
| 7,523,859 B2 | 4/2009 | Patel et al. | |
| 7,581,678 B2 | 9/2009 | Narendra et al. | |
| 7,697,686 B2 | 4/2010 | Puiatti et al. | |
| 7,765,281 B1 | 7/2010 | Crow et al. | |
| 7,840,812 B1* | 11/2010 | Levenberg | H04L 63/0823 713/176 |
| 7,922,082 B2 | 4/2011 | Muscato | |
| 8,095,113 B2 | 1/2012 | Kean et al. | |
| 8,271,395 B2 | 9/2012 | Dominguez et al. | |
| 8,523,059 B1 | 9/2013 | Mullen et al. | |
| 8,700,729 B2* | 4/2014 | Dua | G06Q 20/3674 705/64 |
| 8,850,527 B2 | 9/2014 | Chew et al. | |
| 8,855,314 B2 | 10/2014 | Modave et al. | |
| 8,856,640 B1 | 10/2014 | Barr et al. | |
| 8,909,557 B2 | 12/2014 | Collinge et al. | |
| 8,955,039 B2 | 2/2015 | Prakash et al. | |
| 8,990,572 B2 | 3/2015 | Patefield-Smith et al. | |
| 9,026,462 B2 | 5/2015 | Lin et al. | |
| 9,037,491 B1 | 5/2015 | Lee | |
| 9,195,926 B2 | 11/2015 | Spodak | |
| 9,208,482 B2 | 12/2015 | Laracey | |
| 9,208,490 B2 | 12/2015 | Pitroda et al. | |
| 9,218,479 B2 | 12/2015 | Collinge et al. | |
| 9,361,619 B2 | 6/2016 | Varadarajan et al. | |
| 9,411,601 B2 | 8/2016 | Zimmer et al. | |
| 9,425,968 B2 | 8/2016 | Demeter et al. | |
| 9,775,029 B2 | 9/2017 | Lopez | |
| 9,922,322 B2 | 3/2018 | Flurscheim et al. | |
| 9,972,005 B2 | 5/2018 | Wong et al. | |
| 10,049,353 B2 | 8/2018 | Lopez | |
| 10,270,587 B1 | 4/2019 | Wu | |
| 10,402,814 B2 | 9/2019 | Wong et al. | |
| 10,477,393 B2 | 11/2019 | Lopez | |
| 10,664,824 B2 | 5/2020 | Wong et al. | |
| 10,846,694 B2 | 11/2020 | Wong et al. | |
| 10,909,522 B2 | 2/2021 | Wong et al. | |
| 11,017,386 B2 | 5/2021 | Flurscheim et al. | |
| 11,036,873 B2 | 6/2021 | Lopez | |
| 11,164,176 B2 | 11/2021 | Ngo et al. | |
| 11,783,061 B2 | 10/2023 | Lopez | |
| 11,842,350 B2 | 12/2023 | Wong et al. | |
| 2002/0049636 A1 | 4/2002 | Griffin et al. | |
| 2002/0095580 A1 | 7/2002 | Candelore | |
| 2002/0111919 A1 | 8/2002 | Weller et al. | |
| 2003/0061519 A1 | 3/2003 | Shibata et al. | |
| 2003/0097344 A1 | 5/2003 | Chaum et al. | |
| 2003/0108204 A1 | 6/2003 | Audebert et al. | |
| 2003/0182246 A1 | 9/2003 | Johnson et al. | |
| 2004/0029569 A1 | 2/2004 | Khan et al. | |
| 2004/0034597 A1* | 2/2004 | Durand | G06Q 20/29 705/41 |
| 2004/0236672 A1* | 11/2004 | Jung | G06Q 40/03 705/38 |
| 2005/0027871 A1 | 2/2005 | Bradley et al. | |
| 2005/0156026 A1* | 7/2005 | Ghosh | G06Q 20/341 235/380 |
| 2005/0171898 A1 | 8/2005 | Bishop et al. | |
| 2005/0177522 A1 | 8/2005 | Williams | |
| 2005/0194452 A1 | 9/2005 | Nordentoft et al. | |
| 2005/0238174 A1 | 10/2005 | Kreitzer | |
| 2006/0041655 A1 | 2/2006 | Holloway et al. | |
| 2006/0093149 A1 | 5/2006 | Zhu et al. | |
| 2007/0118483 A1 | 5/2007 | Hill et al. | |
| 2007/0192240 A1 | 8/2007 | Crooks | |
| 2007/0255955 A1 | 11/2007 | Everett et al. | |
| 2007/0276765 A1 | 11/2007 | Hazel et al. | |
| 2008/0011823 A1 | 1/2008 | Patel et al. | |
| 2008/0029598 A1 | 2/2008 | Fernandes et al. | |
| 2008/0126260 A1 | 5/2008 | Cox et al. | |
| 2008/0201577 A1 | 8/2008 | Tuliani | |
| 2008/0249948 A1 | 10/2008 | Kim et al. | |
| 2008/0305769 A1 | 12/2008 | Rubinstein | |
| 2009/0030845 A1* | 1/2009 | Hurry | H04L 9/12 705/50 |
| 2009/0048935 A1 | 2/2009 | Blanc et al. | |
| 2009/0048953 A1 | 2/2009 | Hazel et al. | |
| 2009/0068982 A1 | 3/2009 | Chen et al. | |
| 2009/0106138 A1 | 4/2009 | Smith et al. | |
| 2009/0124234 A1 | 5/2009 | Fisher et al. | |
| 2009/0159700 A1 | 6/2009 | Mullen et al. | |
| 2009/0216681 A1 | 8/2009 | McCown | |
| 2009/0254440 A1 | 10/2009 | Pharris | |
| 2009/0255996 A1 | 10/2009 | Brown et al. | |
| 2009/0264102 A1 | 10/2009 | Parmar et al. | |
| 2009/0282261 A1 | 11/2009 | Khan et al. | |
| 2009/0298478 A1 | 12/2009 | Tyhurst et al. | |
| 2009/0300351 A1 | 12/2009 | Lei et al. | |
| 2009/0323937 A1 | 12/2009 | Teng et al. | |
| 2010/0034383 A1 | 2/2010 | Turk | |
| 2010/0138344 A1 | 6/2010 | Wong et al. | |
| 2010/0153267 A1* | 6/2010 | Ghaidan | G06Q 20/105 705/41 |
| 2010/0246369 A1 | 9/2010 | Sato | |
| 2010/0274712 A1 | 10/2010 | Mestre et al. | |
| 2010/0318468 A1 | 12/2010 | Carr et al. | |
| 2010/0327054 A1 | 12/2010 | Hammad | |
| 2011/0038481 A1* | 2/2011 | Modave | G06F 21/79 380/277 |
| 2011/0078081 A1 | 3/2011 | Pirzadeh et al. | |
| 2011/0240745 A1 | 10/2011 | Brown | |
| 2011/0246369 A1 | 10/2011 | de Oliveira et al. | |
| 2011/0251892 A1 | 10/2011 | Laracey | |
| 2011/0276420 A1* | 11/2011 | White | G06Q 30/06 705/17 |
| 2012/0070129 A1 | 3/2012 | Lin et al. | |
| 2012/0089519 A1 | 4/2012 | Peddada | |
| 2012/0143707 A1 | 6/2012 | Jain | |
| 2012/0143752 A1 | 6/2012 | Wong et al. | |
| 2012/0143770 A1 | 6/2012 | Pauker et al. | |
| 2012/0254041 A1 | 10/2012 | Saxena et al. | |
| 2012/0284195 A1 | 11/2012 | McMillen et al. | |
| 2012/0284526 A1 | 11/2012 | Arnold et al. | |
| 2012/0317628 A1 | 12/2012 | Yeager | |
| 2013/0067216 A1 | 3/2013 | Tanner et al. | |
| 2013/0097080 A1 | 4/2013 | Smets et al. | |
| 2013/0198519 A1 | 8/2013 | Marien | |
| 2013/0212007 A1 | 8/2013 | Mattsson et al. | |
| 2013/0226797 A1 | 8/2013 | Jiang et al. | |

(56) References Cited

U.S. PATENT DOCUMENTS

| | | | |
|---|---|---|---|
| 2013/0262317 A1 | 10/2013 | Collinge et al. |
| 2013/0268776 A1 | 10/2013 | Motoyama |
| 2013/0282502 A1 | 10/2013 | Jooste |
| 2013/0304642 A1 | 11/2013 | Campos |
| 2014/0040149 A1 | 2/2014 | Fiske |
| 2014/0052640 A1 | 2/2014 | Pitroda et al. |
| 2014/0061302 A1 | 3/2014 | Hammad |
| 2014/0074724 A1 | 3/2014 | Gordon et al. |
| 2014/0075496 A1 | 3/2014 | Prakash et al. |
| 2014/0108241 A1 | 4/2014 | Tunnell et al. |
| 2014/0108261 A1 | 4/2014 | Priest et al. |
| 2014/0108263 A1 | 4/2014 | Ortiz |
| 2014/0108265 A1 | 4/2014 | Hayhow et al. |
| 2014/0110477 A1 | 4/2014 | Hammad |
| 2014/0149285 A1 | 5/2014 | De et al. |
| 2014/0207682 A1 | 7/2014 | Wolfond et al. |
| 2014/0244494 A1 | 8/2014 | Davis et al. |
| 2014/0244514 A1 | 8/2014 | Rodriguez et al. |
| 2014/0246490 A1 | 9/2014 | Graylin |
| 2014/0263625 A1 | 9/2014 | Smets et al. |
| 2014/0279309 A1 | 9/2014 | Cowen et al. |
| 2014/0298027 A1 | 10/2014 | Roberts et al. |
| 2014/0351581 A1 | 11/2014 | Pritikin |
| 2014/0358796 A1 | 12/2014 | Smets et al. |
| 2015/0012980 A1 | 1/2015 | Mikolajczyk |
| 2015/0116887 A1 | 4/2015 | Avestruz et al. |
| 2015/0134537 A1 | 5/2015 | Hammad |
| 2015/0172330 A1 | 6/2015 | Kaplan |
| 2015/0178724 A1 | 6/2015 | Ngo et al. |
| 2015/0180836 A1 | 6/2015 | Wong et al. |
| 2015/0227920 A1 | 8/2015 | Sadiq et al. |
| 2015/0332261 A1 | 11/2015 | Park et al. |
| 2015/0339642 A1 | 11/2015 | Park et al. |
| 2015/0339664 A1 | 11/2015 | Wong et al. |
| 2015/0371050 A1 | 12/2015 | Martini |
| 2015/0373762 A1 | 12/2015 | Raj et al. |
| 2016/0019512 A1 | 1/2016 | Buchheim et al. |
| 2016/0028548 A1 | 1/2016 | Yao et al. |
| 2016/0034880 A1 | 2/2016 | Roberts et al. |
| 2016/0057619 A1 | 2/2016 | Lopez |
| 2016/0086073 A1 | 3/2016 | Narendra et al. |
| 2016/0140545 A1 | 5/2016 | Flurscheim et al. |
| 2016/0162883 A1 | 6/2016 | Liscia et al. |
| 2016/0217452 A1 | 7/2016 | Wong et al. |
| 2016/0241402 A1 | 8/2016 | Gordon et al. |
| 2016/0307186 A1 | 10/2016 | Noe et al. |
| 2017/0364707 A1 | 12/2017 | Lal et al. |
| 2017/0364903 A1 | 12/2017 | Lopez |
| 2018/0005227 A1 | 1/2018 | Sandelov et al. |
| 2018/0025353 A1 | 1/2018 | Collinge et al. |
| 2018/0189783 A1 | 7/2018 | Flurscheim et al. |
| 2018/0232722 A1 | 8/2018 | Wong et al. |
| 2018/0324584 A1 | 11/2018 | Lopez |
| 2019/0295063 A1 | 9/2019 | Wong et al. |

FOREIGN PATENT DOCUMENTS

| | | |
|---|---|---|
| CN | 102460491 | 5/2012 |
| CN | 103530775 | 1/2014 |
| CN | 103797500 | 5/2014 |
| JP | 334641 | 2/1991 |
| JP | 2007513529 | 5/2007 |
| JP | 2010004390 | 1/2010 |
| KR | 20050115513 | 12/2005 |
| WO | 2007131956 | 11/2007 |
| WO | 2009136404 | 11/2009 |
| WO | 2012136986 | 10/2012 |
| WO | 2012136987 | 10/2012 |
| WO | 2015095771 | 6/2015 |

OTHER PUBLICATIONS

U.S. Appl. No. 17/222,563, "Corrected Notice of Allowability", dated Dec. 8, 2023, 2 pages.
U.S. Appl. No. 17/489,227, Final Office Action, dated Oct. 20, 2023, 22 pages.
"InnovationQ+", Available Online at: https://iq.ip.com/discover, Accessed from Internet on Aug. 26, 2023, 1 page.
U.S. Appl. No. 17/069,555, Notice of Allowance, dated Aug. 1, 2023, 10 pages.
U.S. Appl. No. 17/069,555, "Supplemental Notice of Allowability", dated Sep. 1, 2023, 2 pages.
U.S. Appl. No. 17/222,563, Notice of Allowance, dated Sep. 6, 2023, 16 pages.
U.S. Appl. No. 17/318,918, "Corrected Notice of Allowability", dated Sep. 8, 2023, 2 pages.
Kiran et al., "Building Robust M-commerce Payment System on Offline Wireless Network", Fifth IEEE International Conference on Advanced Telecommunication Systems and Networks (ANTS), Dec. 18-21, 2011, pp. 1-3.
Rexha, "Increasing User Privacy in Online Transactions with X.509 v3 Certificate Private Extensions and Smartcards", Seventh IEEE International Conference on E-Commerce Technology (CEC'05), Jul. 19-22, 2005, 8 pages.
Application No. SG10201900964Q, Written Opinion, dated Jul. 13, 2023, 8 pages.
Urien, "Emv-TLS, A Secure Payment Protocol For NFC Enabled Mobiles", International Conference on Collaboration Technologies and Systems (CTS), May 19-23, 2014, pp. 203-210.
Wang et al., "A Flexible Payment Scheme and Its Role-based Access Control", IEEE Transactions on Knowledge and Data Engineering, vol. 17, No. 3, Mar. 2005, pp. 425-436.
U.S. Appl. No. 17/318,918, Notice of Allowance, dated May 23, 2023, 7 pages.
U.S. Appl. No. 17/489,227, Non-Final Office Action, dated Jun. 8, 2023, 17 pages.
"2.4.2 How VISA Card Verification Values are Used", 2.4.2 "z/OSV1 R3.0 ICSF Application Programmer's Guide" IBM Library Server, Available Online At: http://publibz.boulder.ibm.com/cgibin/bookmgr_OS390/BOOKS/CSFB4Z20/2.4.2?SHEL, 1997, 1 page.
"Contactless Mobile Payment", EMVCo., Contactless Mobile Payment Architecture Overview, Version 1.0, Jun. 2010, 28 pages.
"EMV Contactless Specifications for Payment Systems", Book a Architecture and General Requirements, XP055402194, Mar. 1, 2011, 124 pages.
"EMV Integrated Circuit Card Specifications for Payment Systems", Books 1-3, Application Specification, Version 4.3, Nov. 2011, 162 pages.
"EMV Integrated Circuit Card Specifications for Payment Systems", Book 2, Security and Key Management, Version 4.3, Nov. 2011, 174 pages.
"EMV Integrated Circuit Card Specifications for Payment Systems", Book 2, Security and Key Management, Version 4.2, XP-002732389, Jun. 2008, 177 pages.
"EMV Integrated Circuit Card Specifications for Payment Systems", Book 2 Security and Key Management, Version 4.1, May 2004, 187 pages.
"EMV Integrated Circuit Card Specifications for Payment Systems, Common Payment Application Specification", Version 1.0, Dec. 2005, 770 pages.
"Petition for Inter Partes Review of U.S. Pat. No. 8,533,860 Challenging Claims 1-30 Under 35 U.S.C. § 312 and 37 C.F.R. § 42.104", USPTO Patent Trial and Appeal Board, IPR 2016-00600, Feb. 17, 2016, 65 pages.
"What Makes a Smart Card Secure? A Smart Card Alliance Contactless and Mobile Payments Council White Paper", Publication No. CPMC-08002, Smart Card Alliance, Oct. 2008, 38 pages.
U.S. Appl. No. 14/046,828, Final Office Action, dated Mar. 29, 2019, 21 pages.
U.S. Appl. No. 14/046,828, Non-Final Office Action, dated Oct. 16, 2020, 13 pages.
U.S. Appl. No. 14/046,828, Notice of Allowance, dated Mar. 25, 2021, 10 pages.
U.S. Appl. No. 14/046,828, "Supplemental Notice of Allowability", dated Apr. 13, 2021, 3 pages.
U.S. Appl. No. 14/046,828, "Supplemental Notice of Allowability", dated May 14, 2021, 3 pages.

(56) References Cited

OTHER PUBLICATIONS

U.S. Appl. No. 14/577,678 , Advisory Action, dated Dec. 21, 2020, 4 pages.
U.S. Appl. No. 14/719,014 , "Corrected Notice of Allowability", dated Sep. 2, 2020, 3 pages.
U.S. Appl. No. 15/890,871 , Non-Final Office Action, dated Sep. 4, 2020, 22 pages.
U.S. Appl. No. 15/890,871 , Notice of Allowance, dated Jan. 6, 2021, 13 pages.
U.S. Appl. No. 16/438,178 , "Supplemental Notice of Allowability", dated Dec. 2, 2020, 2 pages.
U.S. Appl. No. 61/738,832 , "U.S. Provisional Application No.", Management of Sensitive Data, filed Dec. 18, 2012, 22 pages.
U.S. Appl. No. 61/751,763 , "U.S. Provisional Application No.", Payments Bridge, filed Jan. 11, 2013, 64 pages.
U.S. Appl. No. 61/879,632 , "U.S. Provisional Application No.", Systems and Methods for Managing Mobile Cardholder Verification Methods, filed Sep. 18, 2013, 24 pages.
U.S. Appl. No. 61/892,407 , "U.S. Provisional Application No.", Issuer Over-The-Air Update Method and System, filed Oct. 17, 2013, 28 pages.
U.S. Appl. No. 61/894,749 , "U.S. Provisional Application No.", Methods and Systems for Authentication and Issuance of Tokens in a Secure Environment, filed Oct. 23, 2013, 67 pages.
U.S. Appl. No. 61/926,236 , "U.S. Provisional Application No.", Methods and Systems for Provisioning Mobile Devices With Payment Credentials and Payment Token Identifiers, filed Jan. 10, 2014, 51 pages.
U.S. Appl. No. 62/000,288 , "U.S. Provisional Application No.", Payment System Canonical Address Format, filed May 19, 2014, 58 pages.
U.S. Appl. No. 62/003,717 , "U.S. Provisional Application No.", Mobile Merchant Application, filed May 28, 2014, 58 pages.
U.S. Appl. No. 62/024,426 , "U.S. Provisional Application No.", Secure Transactions Using Mobile Devices, filed Jul. 14, 2014, 102 pages.
U.S. Appl. No. 62/037,033 , "U.S. Provisional Application No.", Sharing Payment Token, filed Aug. 13, 2014, 36 pages.
U.S. Appl. No. 62/038,174 , "U.S. Provisional Application No.", Customized Payment Gateway, filed Aug. 15, 2014, 42 pages.
U.S. Appl. No. 62/042,050 , "U.S. Provisional Application No.", Payment Device Authentication and Authorization System, filed Aug. 26, 2014, 120 pages.
U.S. Appl. No. 62/053,736 , "U.S. Provisional Application No.", Completing Transactions Without a User Payment Device, filed Sep. 22, 2014, 31 pages.
U.S. Appl. No. 62/054,346 , "U.S. Provisional Application No.", Mirrored Token Vault, filed Sep. 23, 2014, 38 pages.
U.S. Appl. No. 62/103,522 , "U.S. Provisional Application No.", Methods and Systems for Wallet Provider Provisioning, filed Jan. 14, 2015, 39 pages.
U.S. Appl. No. 62/108,403 , "U.S. Provisional Application No.", Wearables With NFC HCE, filed Jan. 27, 2015, 32 pages.
U.S. Appl. No. 62/117,291 , "U.S. Provisional Application No.", Token and Cryptogram Using Transaction Specific Information, filed Feb. 17, 2015, 25 pages.
U.S. Appl. No. 62/128,709 , "U.S. Provisional Application No.", Tokenizing Transaction Amounts, filed Mar. 5, 2015, 30 pages.
Doherty et al., "Dynamic Symmetric Key Provisioning Protocol (DSKPP)", CiteSeerX, Internet Engineering Task Force (IETF), ISSN: 2070-1721, Dec. 2010, 106 pages.
Elliott et al., "The Use of Near Field Communication (NFC) Technology in Mobile Phones for Public Transport Ticketing", Department of Transport, Research database, Version 1.2a, Nov. 11, 2009, 52 pages.
EP12718316.8 , "Notice of Opposition", Jan. 31, 2019, 24 pages.
Application No. EP14872737.3 , Extended European Search Report, dated Jul. 11, 2017, 8 pages.
Application No. EP15796553.4 , Extended European Search Report, dated Sep. 29, 2017, 11 pages.
Application No. EP17828213.3 , Extended European Search Report, dated Mar. 6, 2019, 7 pages.
IN201647023956 , "First Examination Report", dated Aug. 20, 2020, 7 pages.
Kasper et al., "Subscriber Authentication in Mobile Cellular Networks with Virtual software SIM Credentials Using Trusted Computing", Conference: Advanced Communication Technology, 10th International Conference on, vol. 2, Mar. 2008, 7 pages.
Application No. KR10-2016-7019520 , Notice of Decision to Grant, dated Nov. 23, 2020, 4 pages.
Application No. PCT/GB2012/050737 , International Search Report and Written Opinion, dated Jul. 20, 2012, 13 pages.
Application No. PCT/US2014/071622 , International Search Report and Written Opinion, dated Mar. 27, 2015, 9 pages.
Application No. PCT/US2015/031968 , International Search Report and Written Opinion, dated Jul. 27, 2015, 7 pages.
Radu , "Implementing Electronic Card Payment Systems", Artech House, Inc Applendix D Security Mechanisms, 2003, 1 page.
Radu , "Implementing Electronic Card Payment Systems", Artech House, Chapter-5, ProQuest Ebook Central, Available Online at: http://ebookcentral.proquest.com/lib/uspto-ebooks/detail.action?dociD=227605, 2002, pp. 125-145.
Radu , "Implementing Electronic Card Payment Systems", ProQuest Ebook Central, Chapter-6, Available Online at: http://ebookcentral.proquest.com/lib/uspto-ebooks/detail.action?dociD=227605, 2002, pp. 147-225.
Radu , "Implementing Electronic Card Payment Systems", ProQuest Ebook Central, Available Online at: http://ebookcentral.proquest.com/lib/uspto-ebooks/detail.action?dociD=227605, Appendix D, 2002, pp. 373-398.
Reisinger , "PayPal Offers SMS Security Key for Mobile Users", Available Online at: http://news.cnet/com/8301-17939_1209-10106410-2.html, Nov. 24, 2008, pp. 1-3.
Ruiter et al., "Formal Analysis of the EMV Protocol Suite", Theory of Security and Applications, Mar. 31, 2011, pp. 113-129.
Shoup et al., "Session Key Distribution Using Smart Cards", International Conference on the Theory and Applications of Cryptographic Techniques, May 1996, pp. 1-11.
U.S. Appl. No. 14/577,678 , Notice of Allowance, dated Jul. 21, 2021, 9 pages.
Application No. KR2021-7026400 , Office Action, dated Sep. 8, 2021, 6 pages.
Application No. CN201480069311.1 , Office Action, dated Jan. 7, 2022, 16 pages.
Application No. EP22171039.5 , Extended European Search Report, dated Jun. 10, 2022, 8 pages.
Application No. KR10-2022-7019314 , Office Action, dated Sep. 13, 2022, 5 pages.
U.S. Appl. No. 17/069,555 , Non-Final Office Action, dated Feb. 3, 2023, 21 pages.
U.S. Appl. No. 17/318,918 , Non-Final Office Action, dated Feb. 3, 2023, 11 pages.
Application No. KR10-2022-7019314 , Notice of Decision to Grant, dated Jan. 26, 2023, 4 pages.

* cited by examiner

PAYMENT SYSTEM

CROSS-REFERENCE TO RELATED APPLICATIONS

This application is a continuation application of U.S. patent application Ser. No. 17/358,837, which is a divisional application of U.S. application Ser. No. 14/046,828, filed Oct. 4, 2013, which is a continuation under 35 U.S.C. § 120 of International Patent Application No. PCT/GB2012/050737, filed on Apr. 2, 2012 (and published in the English language by the International Bureau on with International Publication Number WO 2012/136986 on Oct. 11, 2012), which claims priority to GB Application No. 1105765.0, filed on Apr. 5, 2011. The entire contents of each of the above-referenced patent applications is hereby incorporated by reference.

BACKGROUND OF THE INVENTION

Field of the Invention

The present invention relates to the field electronic payment systems and provides methods of and systems for authorizing an EMV payment transaction between a user device and a point-of-sale terminal.

Description of the Related Technology

Electronic payment systems facilitate the electronic transfer of money from one account to another through computer based systems. To allow widespread use of electronic payment systems, integrated circuit cards (ICCs) provisioned with payment applications are commonly used; these provide an alternative to cash when making purchases. An ICC is a portable card containing embedded integrated circuits. ICCs are typically issued by financial institutions, commonly known as issuing banks or issuers, to their customers. A payment application runs on the ICC and contains information related to the account held by the customer with the issuing bank.

FIG. 1 illustrates the components of a conventional electronic payment system. An ICC 102, issued by issuing bank 100, enables a user to interact with a terminal 104 at a point of sale (PoS) in order to make a purchase from a merchant. The terminal 104 subsequently reports the transaction details to the merchant's bank 106, commonly known as the acquiring bank. The transaction is later settled between the issuing bank 100 and the acquiring bank 106, and the proper transfer of funds is arranged.

ICC 102 may interface with PoS terminal 104 via contact or contactless technologies. Contact ICCs are powered by the PoS terminal, and conform to the ISO/IEC 7810 and ISO/IEC 7816 series of standards. Contactless cards may be self-powered, or powered inductively by the PoS terminal and conform to the ISO/IEC 14443 or ISO/IEC 15693 standards.

Before the transaction is completed, the PoS terminal 104 must ensure that the presented ICC 102 is both genuine, and authorized to complete the transaction. Authentication of ICCs and authorization of transactions are handled according to transaction protocols, which ensure the interoperability of a range of ICCs and PoS terminals.

Many electronic payment systems use the EMV (Europay®, Mastercard®, Visa®) transaction protocols, as defined for example in the EMV 4.2 Specifications or the EMV Contactless Specifications for Payment Systems, which are publicly available and published by EMVCo LLC. These protocols are referred to herein as simply "EMV".

In order for an ICC to prove its authenticity to a PoS terminal, the ICC is equipped with a number of data parameters, such as unique certificates and secret keys that allow validation to occur without jeopardizing the secrecy of the data. These data parameters are collectively known as payment keys.

The integrated circuitry embedded into ICCs provisioned with payment applications typically consist of tamper resistant processing and memory elements, which allow secret data parameters, such as a number of the payment keys described above, to be stored on the card while maintaining a high degree of confidence that the data cannot be externally obtained.

Tamper resistance may be provided by the use of a secure cryptoprocessor on the ICC, which stores program instructions and data in an encrypted form, only decrypting them inside the processor when they are executed. Further, the cryptoprocessor may be embedded with packaging employing physical security measures, for example causing data to be wiped from the storage if it is probed by an external source. This tamper resistant processing environment is commonly referred to as a secure element.

Recently, attempts have been made to incorporate payment card functionality into other devices. Most notably, there have been efforts to deploy payment applications onto user devices, such as mobile telephones, equipped with short range wireless technology, such as a Near Field Communications (NFC) antenna, in order to emulate a contactless payment card. The NFC communication protocol is standardized in ISO/IEC 18092.

However, like standard payment cards, these devices have conventionally required a secure element to store and process the necessary secret data, and maintain the level of security required to ensure the secrecy of the data. Secure elements may be embedded as part of the device hardware, on a removable storage card such as a Secure Digital (SD) card, or in the case of a mobile telephony device, incorporated into the subscriber identity module (SIM) card. Other known methods of providing a secure element have included deploying an external secure element accessible via a peripheral interface, such as via a Universal Serial Bus (USB) interface, or via the Bluetooth® wireless communication protocol.

However, there are several reasons why a secure element may not be available for use by a payment application. Firstly, the device on which the payment application is implemented may not be equipped with such a secure element (or an interface by which an external secure element may be accessed). Secondly, the payment application may not be permitted access to the secure element provided, perhaps because the payment application was deployed to the device subsequently to the secure element.

In the case of a mobile telephony device, it is possible to deliver applications or updates to a SIM "over-the-air" via use of the SIM Application Toolkit (STK). However the provisioning of applications in this way requires the co-operation of the mobile network operator and a compliant SIM and mobile telephony device, which may not always be possible.

Hence, it is an objective of the present invention to provide improved methods for providing payment card functionality on a user device, while minimizing any inconvenience to the user of the device and without requiring modification of the EMV infrastructure, or existing PoS hardware.

A brief summary of the relevant conventional methods for processing electronic payments will now be provided to assist in understanding embodiments of the invention.

Data Authentication

EMV provides for the authentication of an ICC card's credentials through offline data authentication. Offline data authentication is carried out during EMV payment transaction processing, and is termed offline as there is no communication between the PoS terminal and the acquiring or issuing banks. The purpose of offline data authentication is to verify that the ICC is presenting a valid set of credentials, and uses a layered public key certification scheme. A certification scheme uses digital signatures to guarantee signed data, and in particular a public key contained within.

Signing is performed on the basis of an asymmetric encipherment mechanism, in which data that is enciphered, or 'signed', through the use of a private key can be deciphered using a corresponding public key, without requiring or implying any knowledge of the original private key. Hence, signed data that can be deciphered with a given public key can be safely assumed to have been encoded by the corresponding private key. EMV approves the use of the RSA algorithm as a suitable asymmetric encipherment mechanism, as described in R. L. Rivest, A. Shamir, and L. Adleman—"A method for obtaining digital signatures and public key cryptosystems", Communications of the ACM, vol. 21, 1978, pp. 120-126, and proposes the use of Elliptic Curve Cryptography for future specifications.

As mentioned above, the certification scheme utilized in EMV is a layered scheme, where a key obtained from a first certificate is used to decipher a second certificate, and so on. All of the data necessary for offline data verification is obtained by the terminal in response to issuing READ RECORD commands to the ICC or other commands such as GET PROCESSING OPTIONS (GPO). The READ RECORD commands are issued at the start of the transaction processing or during the transaction processing and are used to read all of the transaction related data parameters from the ICC. Those parameters that are required during transaction processing are listed in an Application File Locator (AFL). The AFL is a data file stored on the ICC that lists all data records stored on the ICC that may be required during transaction processing.

In response to receiving the READ RECORD commands, or other commands (such as the aforementioned GPO), the ICC sends all of the records that are identified in the AFL to the terminal. The records relevant to offline data authentication include a Certification Authority (CA) Public Key Index, an Issuer Public Key Certificate, the Primary Account Number (PAN) and Signed Static Application Data or an ICC Public Key Certificate depending on the offline data authentication method being employed.

EMV provides several methods of offline data authentication, the choice of which depends on the capabilities of both the ICC and the PoS terminal. The simplest method is Static Data Authentication (SDA), which is for use with ICCs that do not support digital signature generation. Digital signature generation is required by EMV for contactless transactions; therefore SDA is not permitted for use with contactless EMV transactions.

EMV also provides methods that do support dynamic signature generation, of which Dynamic Data Authentication (DDA) is the simplest. Additionally, EMV provides a method called Fast DDA (fDDA) which is optimized for contactless transactions, and a method called CDA, which combines DDA with the subsequent step of Application Cryptogram Generation (described below), in order to allow both operations to be completed in parallel.

FIG. 2 illustrates an exemplary DDA flow diagram according to the known EMV transaction protocols.

At step 200, the terminal reads the application data from the ICC by issuing READ RECORD commands as described above.

At step 202, the terminal uses the CA Public Key Index to identify which CA's Private Key has been used to sign the Issuer Public Key Certificate, and hence which corresponding CA Public Key is required to decipher the Issuer Public Key Certificate. The CA is a highly secure cryptographic facility that signs an Issuer's Public Keys in order to guarantee their authenticity. The CA must be trusted by both the issuing bank and the acquiring bank in order to provide confidence in the signed data.

The terminal maintains a local store of Certification Authority Public Keys, and uses the Certification Authority Public Key Index obtained from the ICC to identify the appropriate one to use in relation to the payment application. Having identified the appropriate CA Public Key, the terminal uses this to decipher the Issuer Public Key Certificate at step 204. Decipherment is performed according to the recovery mechanism appropriate to the encipherment scheme that was used to sign the Issuer Public Key Certificate. Since EMV approves the use of the RSA algorithm, decipherment is performed according to the appropriate RSA recovery mechanism on the basis of the obtained public key.

The data contained in the Issuer Public Key Certificate includes the Issuer Public Key and associated data, such as an Issuer Identifier, Certificate Expiration Date, Certificate Serial Number, Issuer Public Key Length, Issuer Public Key Exponent Length, and a Hash Result. All of these data fields are signed by the CA Private Key, and hence the validity of the information is guaranteed by the CA.

At step 206, the terminal makes a number of checks to determine whether the Issuer Public Key Certificate was deciphered properly, and whether the deciphered information is valid. Firstly the terminal checks the contents of the deciphered header, trailer and format data parameters against known expected values. A hash algorithm is then applied to the concatenation of the data fields in the Issuer Public Key Certificate (excluding the Hash Result parameter), the Issuer Public Key remainder and Issuer Public Key Exponent. The result of the hash algorithm is then compared to the Hash Result value provided in the Issuer Public Key Certificate.

A hash algorithm is a one-way mathematical operation that is used to generate a fixed size result on the basis of a large or variably sized data input. The result depends on the entire data input, and it is computationally difficult to determine input data that would produce a given result. EMV recommends the use of the Secure Hash Algorithm (SHA-1) as standardized in ISO/IEC 10118-3.

The terminal then checks the Issuer Identifier recovered from the Issuer Public Key Certificate against first 3-8 digits of the Primary Account Number read from the ICC. The terminal also checks the Issuer Public Key Certificate Expiration Date (expressed in terms of an expiration month and an expiration year) against the current date to make sure that the last day of the expiration month has not passed, and that the Issuer Public Key Certificate is still valid.

If any of these checks fail, then the offline data authentication process has failed. However, if all of these checks are passed, then the terminal has obtained and verified the Issuer Public Key, which is used to decipher the ICC Public Key Certificate at step 208.

The data contained in the ICC Public Key Certificate includes the ICC Public Key and associated payment application credentials, including the PAN, Certificate Expiration Date, Certificate Serial Number, ICC Public Key Length, ICC Public Key Exponent Length, and a Hash Result. All of these data fields are signed by the Issuer Private Key, and hence the validity of the information is guaranteed by the Issuer, whose identity has in turn been guaranteed by the CA.

At step 210, the terminal makes a number of checks to determine whether the ICC Public Key Certificate was deciphered properly, and whether the deciphered information is valid. Firstly the terminal checks the contents of the deciphered header, trailer and format data parameters against known expected values.

A hash algorithm is then applied to the concatenation of the data fields in the ICC Public Key Certificate (excluding the Hash Result), the ICC Public Key Remainder, the ICC Public Key Exponent and a set of static data to be authenticated, which is made up of a selection of other data files stored on the ICC and retrieved at the start of transaction processing, or during the transaction processing, using the READ RECORD command. The result of the hash algorithm is then compared to the Hash Result value provided in the ICC Public Key Certificate.

The data records that make up the static data to be authenticated are indicated in the AFL by a specific tag value. Only those records which are tagged as being used in offline data authentication are processed. Additional data elements can be identified by an optional Static Data Authentication Tag List contained on the ICC. Including this static data in the hash input allows these extra data parameters to be authenticated by a verified hash result.

The terminal then checks the PAN from the ICC Public Key Certificate against the PAN as read from the ICC card in response to the READ RECORD command. Also, the ICC Certificate Expiration Date (expressed in terms of an expiration month and an expiration year) is checked against the current date to make sure that the last day of the expiration month has not passed, and that the ICC Public Key Certificate is still valid.

If any of these checks fail, then the offline data authentication process has failed. However, if all of these checks are passed, then the terminal has obtained and verified the ICC Public Key, which is then used to confirm that the ICC is equipped with the ICC Private Key.

This is achieved by instructing the ICC to generate a digital signature by signing a specified data set using the ICC Private Key. The result is called the Signed Dynamic Application Data. The data that must be signed by the ICC is defined in a Dynamic Data Object List (DDOL). The ICC may contain a DDOL, but if not, a default DDOL is provided by the terminal. Some data defined in the DDOL must be provided by the terminal, and other parameters may be read from the ICC. Any DDOL must include the Unpredictable Number parameter, which is generated by the terminal. Including the unpredictable number ensures that the data to be signed cannot be predicted, and therefore that the resulting Signed Application Data cannot be spoofed by pre-computing the result.

At step 212, the terminal requests the ICC to apply its digital signature by sending an INTERNAL AUTHENTICATE command. The INTERNAL AUTHENTICATE command includes a data field which contains the necessary terminal sourced data which is to be signed by the ICC.

The Signed Dynamic Application data is transmitted to the terminal at step 214. At step 216, the terminal uses the previously obtained ICC Public Key to decipher the Signed Dynamic Application Data. The data contained in the Signed Dynamic Application Data includes the Dynamic Data and a Hash Result.

Again, at step 218 the terminal makes a number of checks to determine whether the Signed Dynamic Application Data was deciphered properly, and whether the deciphered information is valid. Firstly the terminal checks the contents of the deciphered header, trailer and format data parameters against known expected values.

A hash algorithm is then applied to the concatenation of the data fields in the Signed Dynamic Application Data (excluding the Hash Result) and the dynamic data to be authenticated. The result of the hash algorithm is then compared to the Hash Result value provided in the Signed Dynamic Application Data.

If any of these checks fail, then the offline data authentication process has failed. However, if all of these checks are passed, then the terminal has verified that the ICC does have access to the ICC Private Key, and DDA is successful.

If alternatively SDA is used, the verification steps are the same as shown in FIG. 2 up until step 204, after which the Issuer Public Key is instead used to decipher the Signed Static Application Data. The data contained in the Signed Static Application Data includes a Data Authentication Code and a Hash Result. All of this data is signed by the Issuer Private Key, and hence the validity of the information is guaranteed by the Issuer, whose identity has in turn been guaranteed by the CA.

The terminal again makes a number of checks to determine whether the Signed Static Application Data was deciphered properly, and whether the deciphered information is valid. Firstly the terminal checks the contents of the deciphered header, trailer and format data parameters against known expected values.

A hash algorithm is then applied to the concatenation of the data fields in the Signed Static Application Data, and the set of static data to be authenticated identified by the AFL as described above. The result of the hash algorithm is compared to the Hash Result field obtained from the Signed Static Application Data. Including the static data in the hash input allows these extra data parameters to be authenticated by a verified hash result.

If CDA is used instead of DDA, then the verification steps are the same as in FIG. 3 up until step 210, after which the terminal requests an Application Cryptogram by sending a GENERATE AC command to the ICC (as described below), but also requests it to be signed with a CDA signature. This allows the digital signature to be verified at the same time as processing the Application Cryptogram.

According to some PoS terminal implementations, only support for online authorization is provided, and the step of offline data authentication may optionally be omitted as the transaction will always be sent online for authorization and the responsibility for authentication can also be passed to the issuing bank.

Application Cryptogram Generation

EMV provides for transaction authorization through the generation of application cryptograms. Depending on which options are used from the various EMV specifications, there are several mechanisms available for application cryptogram generation. The generation of application cryptograms will be described herein as per the EMV 4.2 specifications, however it will be clear to the person skilled in the art that alternative mechanisms are also suitable. Throughout the transaction processing, the success or failure of certain checks and actions, such as those described above in relation to offline data authentication, can be recorded in a Terminal Verification Results string (TVR).

The TVR is reviewed during Terminal Action Analysis, and on the basis of its contents, the terminal makes a preliminary decision about whether the transaction should be approved offline, authorized online, or declined. Approval offline comprised the terminal deciding that the transaction can take place without seeking express permission from the Issuing Bank. Online authorization comprises sending details of the transaction to the Issuing Bank for authorization before approving the transaction. In some circumstances, the terminal will decline the transaction offline, before seeking authorization from the Issuing Bank.

The decision of the appropriate course of action for the terminal to take is made on the basis of Terminal Action Codes (TAC) and Issuer Action Codes (IAC). TACs are programmed into the terminal by the acquiring bank, and define the circumstances under which a transaction should be approved offline, authorized online, or declined. IACs are deployed into the ICC by the issuing bank, and also define a set of circumstances under which a transaction should be approved offline, authorized online, or declined. The terminal uses both the TACs and the IACs in order to make a preliminary decision on how to process the transaction.

FIG. 3 illustrates an exemplary Application Cryptogram Generation command flow diagram according to the EMV transaction protocols.

The flow begins at step 300 by comparing the contents of the TVR to the TACs stored at the terminal and the IACs retrieved from the ICC. On the basis of the comparison, the terminal makes a preliminary decision about whether the transaction should be approved offline, authorized online, or declined in step 302.

Depending on the result of the decision made at step 302, the terminal requests a specific type of Application Cryptogram to be generated by sending a GENERATE AC command to the ICC. If the terminal decides to decline the transaction offline, the GENERATE AC command requests Application Authentication Cryptogram (AAC) in step 304. If the terminal decides to attempt to authorize the transaction online, the GENERATE AC command requests an Authorization Request Cryptogram (ARQC) in step 306. If the terminal decides to approve the transaction offline, the GENERATE AC command requests a Transaction Certificate (TC) in step 308.

In response to the GENERATE AC command issued by the terminal, the ICC may perform its own risk management in the form of Card Action Analysis. Card action analysis is performed on the basis of parameters determined by the issuer and stored on the ICC. The result of the Card Action Analysis can only elect an authorization method the same as determined by the terminal or stricter.

If the terminal decides to reject the transaction offline by requesting an AAC as per step 304, the ICC must respond with an AAC in step 310. Any other response from the ICC will cause the transaction processing to fail.

If the terminal decides to attempt to send the transaction online for authorization by the issuing bank by requesting an ARQC as per step 306, as a result of the Card Action Analysis in step 312 the ICC may decide to respond with an ARQC in step 314 as requested, or elect to decline the transaction offline by responding with an AAC in step 310. A response from the ICC comprising a TC will cause the transaction processing to fail.

If the terminal decides to allow the transaction offline by requesting a TC as per step 308, as a result of the Card Action Analysis in step 312 the ICC may decide to respond with a TC in step 316 as requested, elect to send the transaction online for authorization by the issuing bank by responding with an ARQC in step 314, or elect to decline the transaction by responding with an AAC in step 310.

If the ICC responds with an ARQC, the terminal attempts to send this to the issuing bank for authorization in step 318. If the result of the online authorization procedure is to reject the transaction, the terminal requests an AAC in step 320 by sending a second GENERATE AC command, and the AAC is returned by the ICC in step 310. If the result of the online authorization procedure is to authorize the transaction, the terminal requests a TC in step 322 by sending a second GENERATE AC command, and the AAC is returned by the ICC in step 316.

Alternatively, if the online authorization procedure cannot be completed, the terminal reverts to a default method as defined in the TAC/IAC, by sending a second GENERATE AC command which either requests an AAC as per step 320, which is returned by the ICC in step 310, or a TC in step 322, which is returned by the ICC in step 316.

Once the ICC has responded with either an AAC or a TC as per steps 310 or 316 respectively, the Application Cryptogram Generation command flow is completed.

In order to respond to a GENERATE AC command issued by the terminal, the ICC must produce an Application Cryptogram. An Application Cryptogram is produced on the basis of data sent to the ICC in the data field of the GENERATE AC command. The data to be used is specified in a Card Risk Management Data Object List (CDOL), which is stored in the ICC. The ICC stores two CDOLs, one for use with the first GENERATE AC command issued in a given transaction, and the other to be used if a second GENERATE AC command is issued.

The encipherment of the application data and the generation of the application cryptogram is preformed on the basis of a 16-byte ICC Session Key. An ICC Session Key is a unique key generated by the ICC which is only valid for use with one transaction. Each ICC Session Key is derived from a 16-byte unique ICC Master Key, deployed securely on the ICC by the issuing bank, and a 2-byte Application Transaction Counter (ATC). The ATC is employed as diversification data, which ensures variation between the ICC Session Keys used in each transaction.

FIG. 4 illustrates the process of deriving an ICC Session Key from a unique ICC Master Key 400 according to the EMV protocols.

ATC 402 is used to create left diversification data 404 by appending it with hexadecimal data value "F0" and padding the remaining 5 bytes with zeros. Similarly, right diversification data 406 is generated by appending the ATC value with hexadecimal data value "0F" and padding the remaining 5 bytes with zeros.

The Session Key is generated in two halves by using the Triple Data Encryption Standard (3DES) algorithm. 3DES is specified in ISO/IEC 18033-3, and is used to encipher an 8-byte input into an 8-byte cipher-text output using a 16-byte secret key.

The leftmost 8-bytes of the session key 408 are generated by applying the 3DES algorithm 410 to the left diversification data 404, using the ICC Master Key 400 as the secret key. Similarly, the rightmost 8-bytes of the session key 412 are generated by applying the 3DES algorithm 414 to the right diversification data 406, using the ICC Master Key 400 as the secret key.

The leftmost 8-bytes of the session key 408 and the rightmost 8-bytes of the session key 412 are then concatenated to form the ICC Session Key 416.

The ICC Session Key can then be used to generate an application cryptogram. How the Session Key is used to generate the application cryptogram is specific to the payment system being implemented.

If CDA is selected as the method for offline data authentication (as described previously), the terminal will request application cryptograms to be signed by the ICCs digital signature, allowing offline data authentication to be performed simultaneously with the steps described above.

The commands used in application cryptogram generation may differ from those described above depending on which of the options form the various EMV specifications are used. For example, instead of using GENERATE AC, the required payment processing may be incorporated into an alternative command, such as GPO.

United States patent application US 2005/0156026 A1 describes conducting EMV payment transactions wirelessly using a mobile terminal.

United States patent application US 2011/0038481 A1 describes a hierarchical key storage system for electronic circuits.

SUMMARY

In accordance with embodiments of the present invention, there is provided a method, apparatus and computer software for authorizing an EMV transaction according to the appended claims.

More specifically, in a first aspect of the present invention, there is provided a method for authorizing an EMV payment transaction between a user device and a point-of-sale terminal, the EMV payment transaction being one that is authorized as part of the payment transaction by an issuing bank, wherein the issuing bank holds data indicative of a ICC Master Key corresponding to a payment application provisioned to the user device, the payment application having a first operative state wherein the payment application is enabled to conduct the EMV payment transaction, and a second operative state, different to the first operative state, the method comprising:
  responsive to receiving a session key, different from the ICC Master Key, generated by the issuing bank on the basis of the ICC Master Key, provisioning the payment application with the session key, whereby to configure the payment application into the first operative state; and thereafter
  responsive to receiving a request for an application cryptogram at the payment application from the point-of-sale terminal, using the payment application to perform an authorization process, the authorization process comprising the steps of:
  generating the application cryptogram on the basis of the received session key; and
  transmitting the generated application cryptogram to the point-of-sale terminal for verification thereof by the issuing bank and authorization of the EMV payment transaction.

A payment application may relate to software configured so as to be able to control communication with a point-of-sale terminal in accordance with the EMV transaction protocols. A user device may relate to a portable electronic device comprising computational hardware. One example of a user device is a mobile telephony device, such as a smart phone.

The ICC Master Key is a unique key associated with the payment application, from which session keys may be derived. Session keys are keys required during the processing of an EMV transaction, and each session key is valid for use only with a single transaction. An application cryptogram is a set of data enciphered using a session key by a payment application. An application cryptogram is required by the point-of-sale terminal during the processing of an EMV transaction.

By holding the ICC Master Key at the issuing bank, in contrast to the prior art in which the ICC Master Key is held by the payment application, and by authorizing transactions on the basis of a session key derived therefrom, embodiments of the present invention are able to reduce the risk associated with a successful attack on the payment application. A successful attack against the payment application storing only a limited number of session keys would yield payment credentials valid only for a single, or a limited number of, transactions, and hence the effectiveness of such an attack is significantly reduced. By reducing the risk associated with a successful attack on the payment application, embodiments of the present invention facilitate the provisioning of the payment application in a manner that does not require the use of security features provided by a secure element.

Preferably, the user device comprises a first processing portion and a second processing portion, the first processing portion comprising a first application environment within a secure element and the second processing portion comprising a second application environment external to the secure element, and wherein the second processing portion comprises said payment application.

A processing portion may relate to a combination of conventional computational components, such as a central processing unit, random access memory and read only memory. An application environment may relate to a logical view of a processing portion in which an application, made up of a combination of software instructions, may execute. A secure element may provide a processing portion and application environment with additional hardware security features, such as tamper resistance, which may be provided through the use of a secure cryptoprocessor. One example of a secure element is that provided by a Subscriber Identity Module (SIM) card with respect to a mobile telephony device.

Preferably, and responsive to a predetermined criterion being satisfied, a further session key is provisioned to said user device.

The predetermined criterion may comprise the number of unused session keys on the user device falling below a certain value, the user device sending a request for more session keys or a predetermined period of time elapsing since the provisioning of the last session key. The provisioning of the further session keys may take place via a packet switched communications network such as the internet, a circuit switched communications network such as a mobile telephony network, or a combination of both.

The user device can communicate with the point-of-sale terminal using short range wireless technologies, for example a radio frequency communication protocol such as a Near Field Communications standard.

According to further aspects of the present invention there is provided a user terminal or device adapted to process an EMV payment transaction in conjunction with a point-of-sale terminal according to the aforesaid method, and a system adapted to provision the aforementioned session key to the user device. In addition there is provided a computer program, or a suite of computer programs, which, when executed, cause a user device to perform the aforesaid method.

While embodiments of the invention are suitable for processing environments that include a secure element, it will be appreciated that embodiments of the invention can be implemented in an environment that does not have a secure element, as the management and issuance of keys in accordance with the described embodiments is independent of the existence of a secure element.

Further features and advantages of the invention will become apparent from the following description of preferred embodiments of the invention, given by way of example only, which is made with reference to the accompanying drawings.

DETAILED DESCRIPTION OF CERTAIN INVENTIVE EMBODIMENTS

Figure 5:
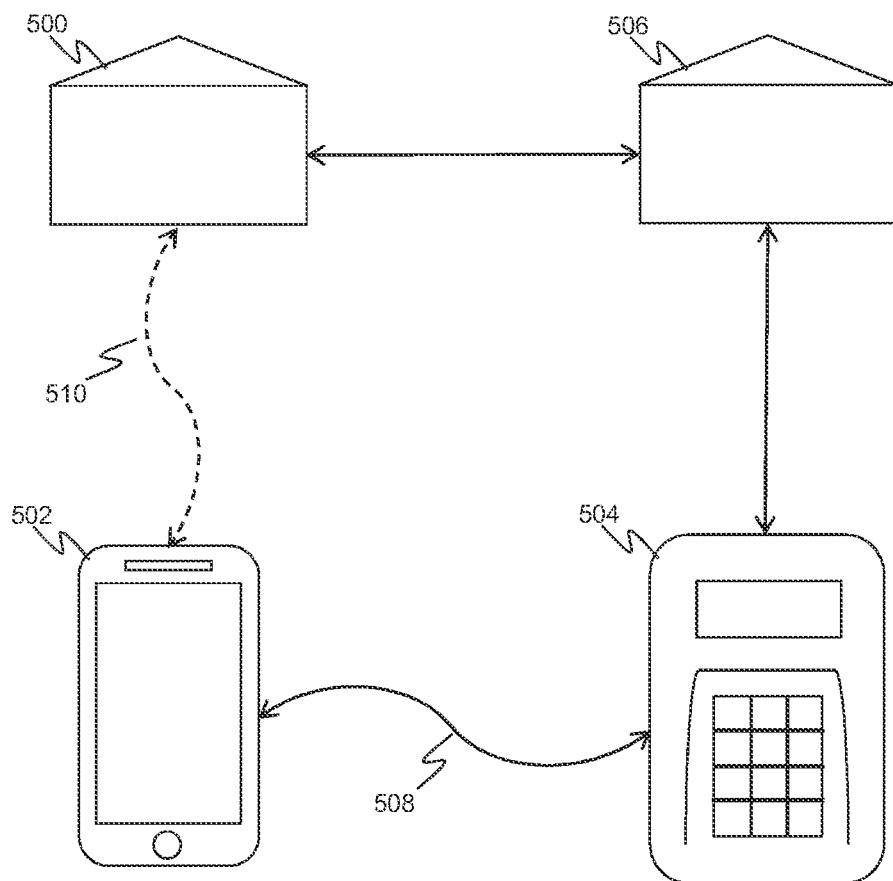
FIG. 5 shows components of an electronic payment system according to an embodiment of the present invention.

FIG. 5 illustrates the components of an electronic payment system according to an embodiment of the present invention.

User device 502 is provisioned with a payment application associated with issuing bank 500. The user of device 502 can interact with a terminal 504 at a PoS via user device 502 in order to make a purchase from a merchant. The PoS terminal 504 can communicate with the acquiring bank 506, and the transaction is later settled between the issuing bank 500 and the acquiring bank 506, once the proper transfer of funds has been arranged.

According to embodiments of the invention, the user device 502 can communicate with the PoS terminal via contactless communication interface 508. This may be via a short range wireless communication protocol, such as NFC.

User device 502 is further capable of communicating with issuing bank 500 via communications interface 510. The communication medium used for communications between the issuing bank 500 and user device 502 depends on the capabilities of the user device. User device 502 may communicate with issuing bank 500 via the internet. Alternatively, if user device 502 is a mobile telephony device, the user device may communicate with issuing bank 500 via the mobile telephony network.

Figure 6:
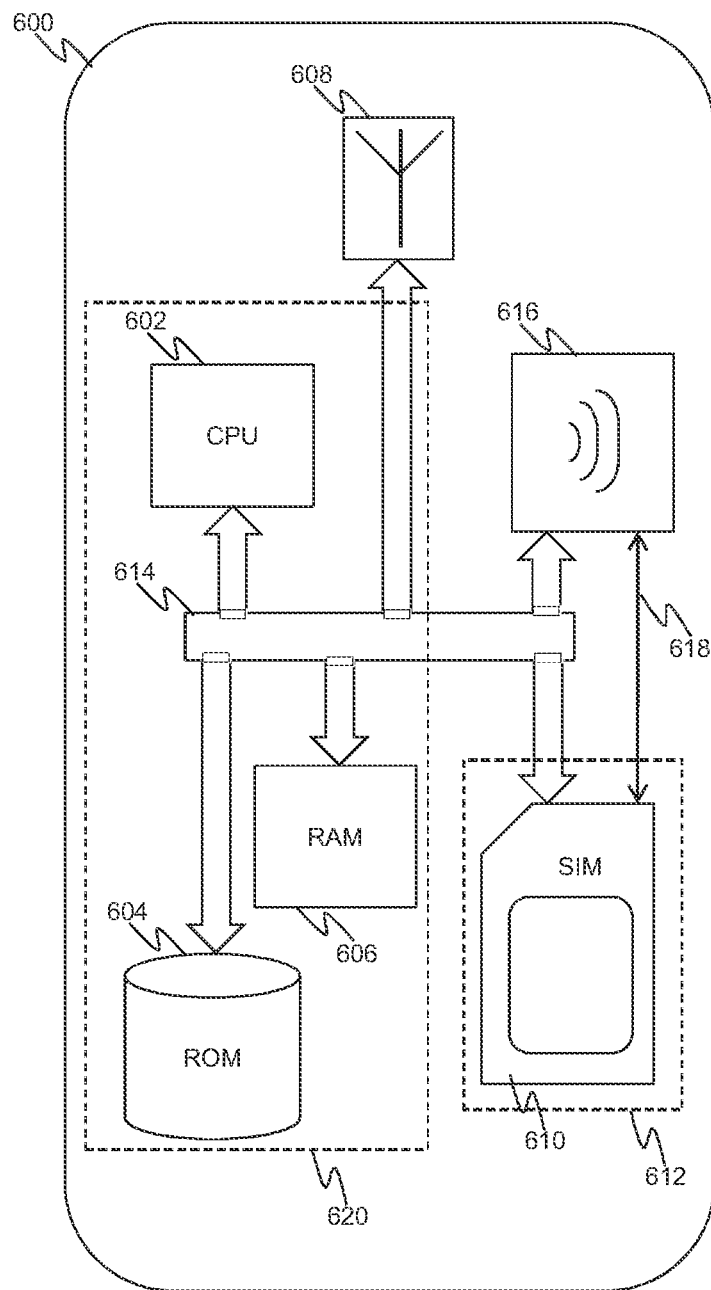
FIG. 6 shows a functional block diagram of a user device configured according to an embodiment of the present invention.

FIG. 6 illustrates exemplary components of a user device according to embodiments the present invention wherein the user device comprises a mobile telephony device.

User device 600 comprises conventional computational hardware including a processing portion 602, read only memory 604, random access memory 606, and other standard hardware such as an input/output controller, display controller etc. (not shown). User device 600 also comprises specific mobile telephony hardware including telephony antenna 608, and SIM card 610. The SIM card 610 constitutes a secure processing environment on the user device, also known as secure element 612, and incorporates additional security measures such as tamper resistance. The components described above are accessible to processing portion 602 via an internal communication structure, such as system bus 614. The operation and interaction of these components is well known in the art and therefore will not be covered in further detail here.

User device 600 also includes short range wireless communications hardware, including short range wireless antenna 616, which can be used to make contactless communication with a PoS terminal, and may be an NFC antenna.

Typically, where short range wireless antennas have hitherto been provided in known mobile telephony devices, they have been controlled by the SIM 610, via a dedicated communication channel 618, separate to system bus 614. The dedicated communication channel 618 may, for example, use the Single Wire Protocol for communication.

According to embodiments of the present invention, the short range wireless antenna is accessible from an area outside of secure element 612, hereafter known as the standard application environment 620, for example via the system bus 614.

Standard application environment 620 also comprises a payment application deployed on device 600. The payment application may be installed on the standard application environment at the time of manufacture of the device, or under the supervision of the issuing bank. Alternatively the payment application may be installed by the end user of the device. An end user may install the application by downloading the installation files to the user device, for example via the internet. Alternatively a user may install the application by downloading the installation files first to another device, such as a personal computer, and then sideloading the files onto to the user device, for example via a USB connection. Alternatively still, a user may obtain the installation files by accessing an application portal on the user device, such as the Apple® AppStore™, or the Android Market™, which facilitate an integrated download and installation of application files. The download of installation files facilitated by an application portal may be provided via an available internet connection, or over-the-air provisioning (OTAP).

According to embodiments of the invention, the payment keys, which are necessary for the use of the payment application, are provided subsequently to the installation of the payment application, under the control of the issuing bank. Equipping the user device with the payment keys in this manner has the effect of activating the payment application, thereby associating it with an account at the issuing bank, and enabling it to conduct EMV payment transactions. The payment keys may be stored in an encrypted state in a memory portion associated with the standard application environment such as in read only memory 604 or an alternative persistent memory, using, for example, the Advanced Encryption Standard (AES). The key used to encrypt and decrypt such payment keys may be stored in persistent memory on device 600, or may be derived from an input received from the user, such as a password entered on the device, a pattern entered on the screen or by the entry of biometric data such as a fingerprint scan or facial feature recognition.

According to some embodiments of the invention, standard application environment 620 may further comprise a Trusted Execution Environment (TEE), for example as outlined by Global Platform Inc. in "TEE System Architecture", available from www.globalplatform.org, and other related specifications. A TEE enables the safe execution of authorized software or applications by storing and processing data in a logically isolated manner, causing the various applications to be logically segregated from each other. A TEE provides protection from attacks against protected data by malicious software, but does not provide the physical protection of a secure element, such as tamperproof processing and memory components. Where a TEE is available on device 600, at least a part of the payment application may be stored and/or executed in the TEE. Additionally or alternatively, the payment keys may be stored in the TEE. Where the payment keys are stored in an encrypted state outside of the TEE, the key to that is used to encrypt and decrypt the payment keys may be stored in the TEE.

Figure 1:
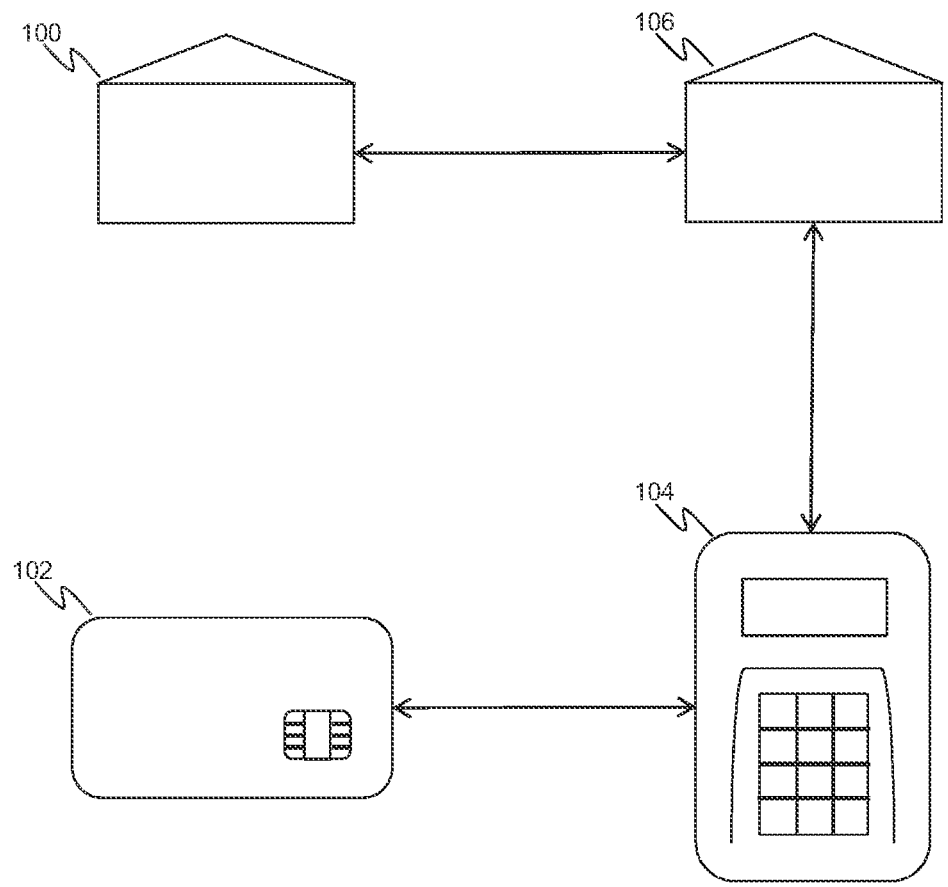
FIG. 1 shows the components of a conventional electronic payment system.
Figure 2:
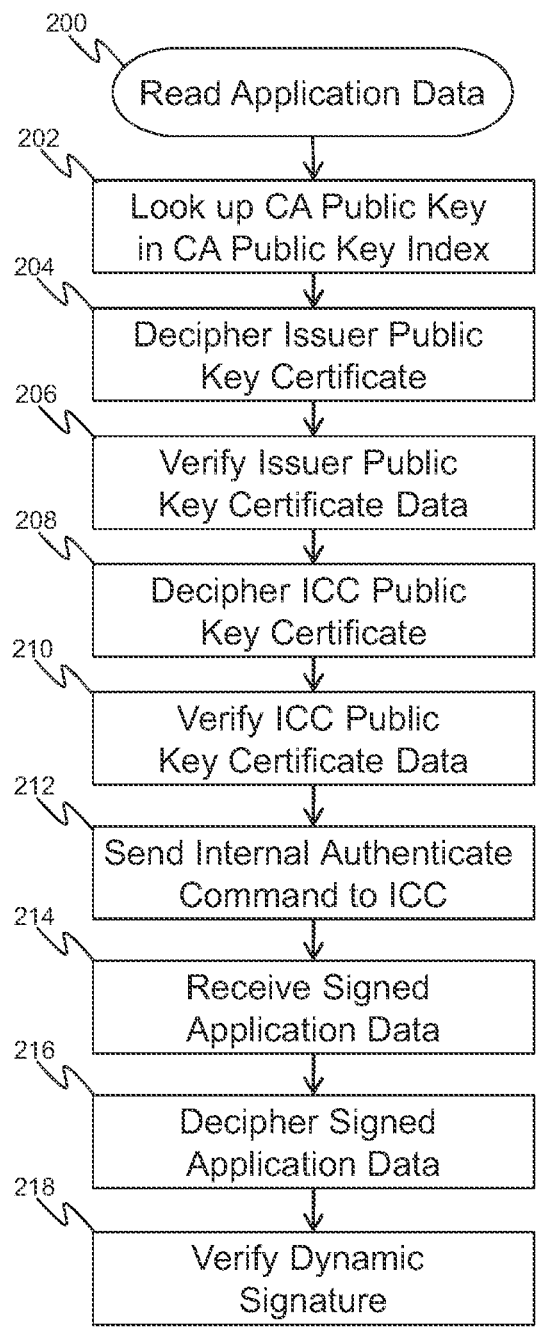
FIG. 2 shows an exemplary DDA flow diagram according to the known EMV transaction protocols.
Figure 3:
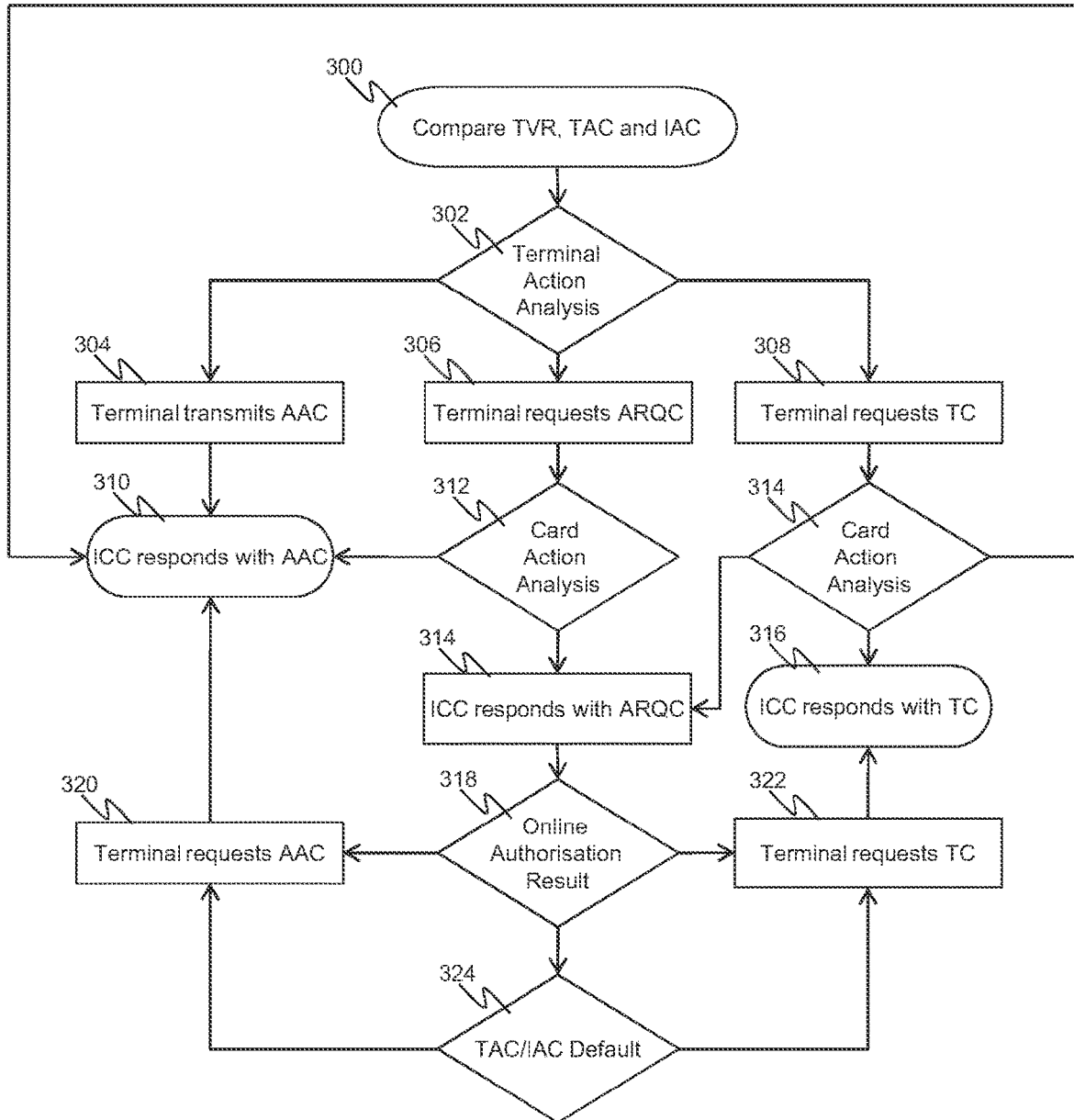
FIG. 3 shows an exemplary Application Cryptogram Generation command flow diagram according to the known EMV transaction protocols.
Figure 4:
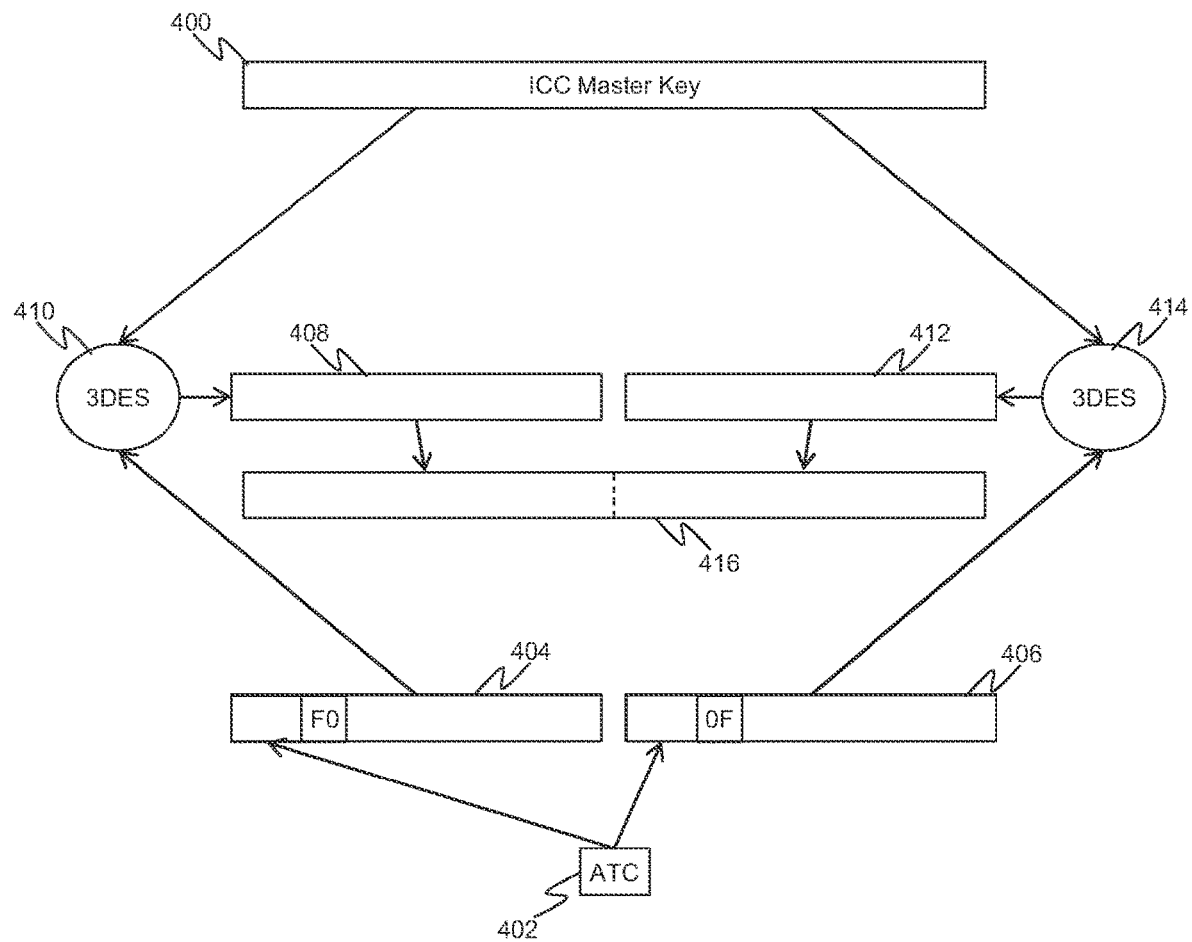
FIG. 4 shows the process of deriving an ICC Session Key from an ICC Master Key according to the known EMV transaction protocols.

In addition, the payment application is configured such that the ICC Master Key is not held locally on the user device, and instead held by a remote entity such as the issuing bank. The user device is provisioned with an ICC Session Key, generated by the issuing bank on the basis of the ICC Master Key. The ICC Session Key can be generated by the issuing bank in accordance with, for example, the method described above in relation to FIG. 4.

The user device is therefore devolved of both the responsibility and the ability to generate its own ICC Session Keys. Hence a successful attack against the stored encrypted data on the user device will result in an attacker obtaining an ICC Session Key that is valid for only a single transaction, not a large number of transactions as would be the case if the ICC Master Key were obtained.

Since an ICC Session Key is valid only for a single transaction, once it has been used to generate the Application Cryptogram(s) required during a single EMV transaction, it is of no further use to the payment application. In some arrangements, after an EMV transaction has been completed, the ICC Session Key is discarded, which may involve the user device purging the stored ICC Session Key from its memory.

Once the provided ICC Session Key has been used to complete a payment transaction, the payment application is no longer equipped to complete an EMV transaction, and as such the payment application can be considered to be in an inoperative state. This is in contrast to the state that the payment application is in when the ICC Session Key is unused, when the payment application can be considered to be in an operative state. The discarding of the ICC Session Key as described previously may form a trigger condition for configuring the payment application into the inoperative state.

In order to prevent the payment application becoming permanently inoperable once the provided ICC Session Key has been used, embodiments of the present invention utilize the communication interface between the user device and the issuing bank to facilitate the provisioning of further ICC Session Keys.

Given the secrecy of the information being transferred from the issuing bank to the user device, the communication must be carried out according to secure protocols. In one arrangement the issuing bank and the user device communicate via the internet according to an appropriate secure messaging protocol such as Hypertext Transfer Protocol Secure (HTTPS). In the case of the current example, the issuing bank and the user device may communicate via the mobile telephony network, for example using High-Speed Packet Access (HSPA) and an appropriate secure messaging protocol, in order to retrieve the ICC Session Keys.

Receipt of a new ICC Session Key at the user device may cause the previously stored ICC Session Key to be overwritten. Alternatively, if the previously used ICC Session Key was discarded after the completion of a transaction, the newly received session key can simply be stored.

In some arrangements, the user device is configured to maintain a store of multiple ICC Session Keys in order to reduce the frequency in which ICC Session Keys must be provisioned to the user device. This allows the user to complete multiple transactions without requiring a corresponding number of communication instances between the user device the issuing bank. This is particularly advantageous if the connection between the user device the issuing bank is interrupted, as the user may proceed with several transactions during this period. Where the user device maintains a store of multiple ICC Session Keys, a used ICC Session Key may be discarded as described above, flagged as used and therefore unavailable for use in future transactions, or merely removed from a maintained index of unused ICC Session Keys.

The provisioning of a new ICC Session Key may be triggered by a number of different conditions. Firstly, the user device may monitor the number of unused ICC Session Keys stored on the user device, and request a new ICC Session Key when all of the available ICC Session Keys have been used. Secondly, the user device may anticipate the depletion of the available ICC Session Keys, and request a new ICC Session Key when the number of available ICC Session Keys falls below a given threshold. This method avoids the situation where the communication channel between the user device and the issuing bank is interrupted when the last ICC Session Key used, rendering the user device without a valid ICC Session Key for subsequent transaction processing.

Additionally, new ICC Session Keys may be provisioned to the device by the issuing bank without requiring a request to be made by the user device. The issuing bank may determine the number of ICC Session Keys that have been used each time a transaction is sent online for explicit authorization by the issuer, and decide whether further ICC Session Keys should be provisioned accordingly. According to some arrangements, the issuing bank may periodically provision new ICC Session Keys to the user device, which will be described in further detail below.

The issuer may keep a record of when each ICC Session Key was provisioned to the user device in order to determine how long ago a given ICC Session Key was provisioned. If a transaction is sent online for authorization, the issuer is able to limit the effective lifespan of the provisioned ICC Session Keys by declining authorization of transactions using ICC Session Keys that were provisioned to the user device before a certain time. In some arrangements, the issuer may utilize a threshold amount of time when determining whether to authorize a transaction, for example by declining authorization of transactions which use an ARQC encoded using an ICC Session Key that was provisioned before a date defined by the threshold amount. The threshold amount of time used by the issuer when determining whether to authorize a transaction can also be referred to as the lifetime of the ICC Session Keys, since an ICC Session Key is stored on the user device for longer than this threshold amount will no longer be accepted for online authorization.

The issuing bank may monitor the amount of time that has elapsed since the provisioning of a previously provisioned ICC Session Key and provision a new ICC Session Key to the user device in response to the amount of time exceeding the threshold amount. Alternatively, the issuing bank may anticipate the amount of time that has elapsed since the provisioning of a previously provisioned ICC Session Key exceeding the threshold amount and provision a new ICC Session Key to the user device before the threshold is passed. As noted above, for the case where the user device anticipates the depletion of the available ICC Session Keys, this has the advantage of avoiding the situation where the communication channel between the user device and the issuing bank is interrupted at the time the threshold is passed, which would otherwise render the user device without a valid ICC Session Key to use in subsequent transactions.

In other arrangements the user device, or more specifically the payment application, may monitor the amount of time that has elapsed since a last ICC Session Key was provisioned in order to detect when the amount of time passes a locally maintained threshold value, and in response request one or more new ICC Session Keys from the issuing bank. This local threshold value may be the same as the value used at the issuing bank, or configured to be sorter, in order to avoid the situation described above where the user device may be rendered without a valid ICC Session Key for use in subsequent transactions.

A new ICC Session Key received in response to a previously provisioned ICC Session Key nearing or exceeding its lifetime, may overwrite the previously provisioned ICC Session Key to ensure that only ICC Session Keys that have not exceeded their lifetime are used in subsequent transaction processing. In some arrangements, the payment application may discard ICC Session Keys that have been stored at the user device for longer than the local threshold value of time. In alternative arrangements, ICC Session Keys may be maintained even after the local threshold has passed, for use in offline transactions.

In order to prevent genuine transactions being declined by the issuer, the issuing bank can provision the user device with new ICC Session Keys on the basis of the threshold amount of time described above, as well as or in place of the criteria described previously.

In some arrangements the ICC Session Keys may be encrypted and stored so as to be inaccessible to the payment application without specific input from the user. In this manner, the ICC Session Keys can be made available to the payment application on a one by one basis and has the advantage of allowing an extra level security to be implemented on the user device by forcing the user to provide the decryption key, for example in the form of a password, before releasing an ICC Session Key to be made available to the payment application. This arrangement also has the additional advantage of requiring any attack made against the encrypted payment keys stored on the user device to decrypt two separately encrypted data portions, one comprising the stored ICC Session Keys, and one comprising the remaining payment keys. Decrypting an ICC Session Key and providing it to the payment application in this way has the effect of configuring the payment application into the operative state, enabling it to conduct an EMV transaction.

Figure 7:
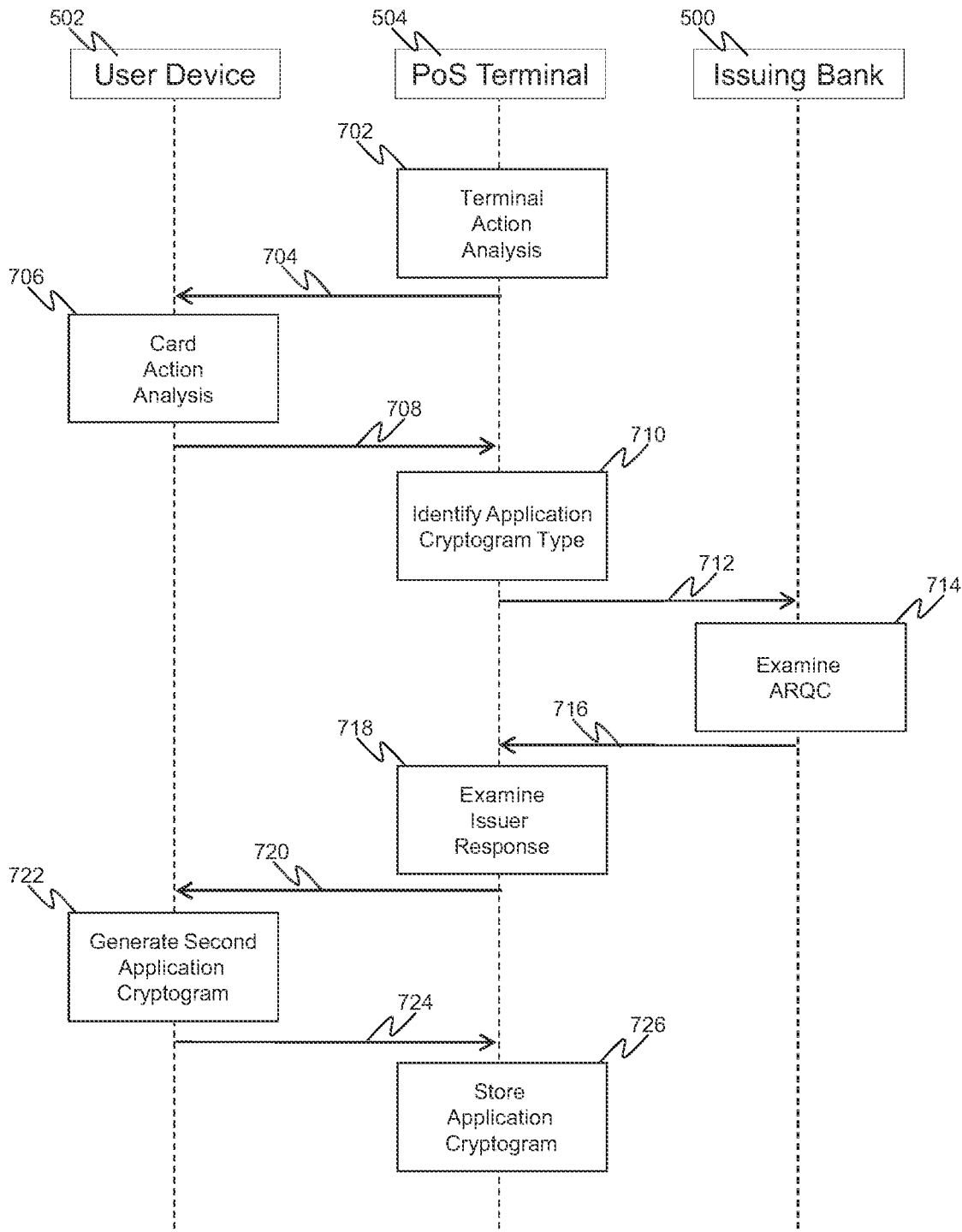
FIG. 7 shows a message flow diagram illustrating an online authorization process according to an embodiment of the present invention.

FIG. 7 illustrates a message flow diagram for online authorization according to an embodiment of the present invention. The process starts with the PoS terminal 504 performing Terminal Action Analysis (702) to determine how to authorize the transaction. When the Terminal Action Analysis is completed PoS terminal 504 issues a GENERATE AC command to the user device in step 704. In order for a transaction to be authorized online, the terminal 504 must request either a TC or an ARQC. In response to receiving the GENERATE AC command, the user device performs Card Action Analysis in step 706 and responds with an Application Cryptogram in step 708, which in this case is assumed to be an ARQC. An Application Cryptogram is generated on the basis of an aforementioned ICC Session Key and transaction specific data. In response to receiving the Application Cryptogram, the terminal identifies the type of Application Cryptogram sent by the user device in step 710 and forwards the ARQC to the issuer in step 712 for authorization of the transaction.

The issuer then examines the ARQC in step 714 in order to make a decision on whether to authorize the transaction. Optionally, the issuer may identify which Session Key was used to generate the ARQC, determine the amount of time that has passed since that ICC Session Key was provisioned to the user device, and make the decision on whether to authorize the transaction on the basis of whether that amount of time exceeds the aforementioned threshold amount.

The issuer reports its decision to the PoS terminal in step 716, and on the basis of that decision the PoS terminal requests a second Application Cryptogram from the user device in step 720. If the issuer decided to reject the transaction, the terminal requests an AAC from the user device. If the issuer decided to authorize the transaction, the terminal requests a TC from the user device. In response to receiving the request in step 720, the user device generates a second Application Cryptogram in step 722, and sends this to the terminal in step 724. The Application Cryptogram is stored by the terminal in step 726, and the authorization process is complete.

Hence, embodiments of the present invention are able to restrict the usability of the payment keys stored on the user device not only on the basis of a number of uses, but also on an amount of time.

As discussed previously, the viability of a payment application relies on maintaining the confidentiality of a number of the payment keys. Conventionally, the payment keys are deployed on the ICC at the time of issuance, and are fixed for the lifetime of the payment application, which is typically in the region of three years. Due to the use of the secure element in conventional methods, it can be safely assumed that the payment keys will not be compromised within the lifetime of the payment application.

Payment applications deployed in a standard application environment, such as contemplated in embodiments of the present invention, do not benefit from the enhanced protection measures that a secure element can provide for storage and processing of the payment keys. The payment keys are stored within the standard application environment, for example in the ROM or other persistent memory portion, and encrypted in order to help protect against attacks made against the user device with the aim of compromising the payment keys. Alternatively, for devices that include a TEE, the payment keys may be stored in the TEE (either encrypted or unencrypted).

Although encrypting the payment keys provides a certain level of protection against these attacks, this is not equivalent to the level of protection provided by a secure element. In particular, data stored in a standard application environment is susceptible to attacks such as buffer overflow attacks, operating system modification and physical intrusion, against which a secure element is immune. Where the payment keys are stored in a TEE, a higher degree of software protection is provided, but the payment keys remain vulnerable to physical intrusion.

However, by limiting or restricting the usefulness of one or more of the payment keys provided, the risk associated with a successful attack on the encrypted data can be reduced to an acceptable level.

The method provided by the present invention for limiting the usefulness of one or more of the payment keys relates to the ICC Master Key utilized in the generation of ICC Session Keys for the Application Cryptogram Generation process described above. Conventionally, where the ICC Master Key is provided within the payment application, the payment application is equipped to generate ICC Session Keys as required. The EMV 4.2 specification limits the number of ICC Session Keys that may be generated by an ICC Master Key at 65535, but provides no method of limiting the usefulness of the ICC Master Key beyond this level in a way that can sufficiently limit the risk of a successful attack against the payment keys. However, by holding the ICC Master Key at the issuing bank, and configuring the payment application with a limited number of ICC Session Keys, embodiments of the present invention reduce the risk posed by a successful attack.

Further, by limiting the lifetime of the ICC Session Keys, embodiments of the invention are able to further reduce the risk associated with a successful attack on the payment keys. A common form of attack against encrypted data is known as a brute force attack. A brute force attack involves systematically checking a large number of possible decryption keys with an aim of eventually discovering the correct key required to decrypt the data. By reducing the valid lifetime of one or more of the payment keys to less than a predicted brute force decryption time required to implement a successful brute force attack against the encrypted data, it is possible to render the brute force attack ineffective. This is because during the time that is required for the brute force attack to succeed, the payment keys that are obtained will no longer be valid in their entirety, and hence cannot be used to successfully complete an online payment transaction.

In order to determine an appropriate value for the lifetime of an ICC Session Key, an estimated brute force decryption time for the encrypted data on the user device can be calculated. Additionally, consideration may be given to vulnerabilities in any method used to encrypt/decrypt the keys. For example a weak password (such a one with few characters or made up of dictionary words) may yield a lower estimated brute force decryption time. As described previously, by configuring the lifetime of the provisioned ICC Session Keys to be less than the predicted brute force decryption time required to implement a successful attack, it is possible to render a brute force attack ineffective, since the attack would take longer than the lifetime of the ICC Session Key.

The above embodiments are to be understood as illustrative examples of the invention. Further embodiments of the invention are envisaged. For example, the user device may comprise a mobile telephony device able to communicate with the issuing bank via the mobile telephone network according to one or more mobile network communication protocols, such as High Speed Packet Access (HSPA) or CDMA2000. Further, the user device could be an internet enabled device, able to communicate with the issuing bank via the internet according to one or more packet based communication protocols, such as an appropriate protocol from the Internet Protocol (IP) suite. Additionally, the method of the present invention can be worked by arranging the user device to communicate with an agent of the issuing bank, instead of the issuing bank itself, wherein the agent is equipped with the necessary data required for provisioning to the payment application. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method comprising:
   generating, by a server computer, a session key based on a Master Key;
   transmitting, by the server computer, the session key to a user device comprising a payment application, the payment application having a first state wherein the payment application is enabled to conduct a payment transaction, and a second state, different to the first state, wherein the user device generates an application cryptogram on the basis of the received session key, and provides the application cryptogram to a terminal after the terminal sends a cryptogram request to the user device;
   receiving, by the server computer, from the terminal, the application cryptogram in an authorization request for a transaction;
   verifying, by the server computer, the application cryptogram by identifying the session key using the identified session key to verify the application cryptogram; and
   responsive verifying the cryptogram, transmitting, by the server computer to the terminal, an authorization response.

2. The method of claim 1, wherein the server computer is an issuing bank server.

3. The method of claim 1, wherein verifying the cryptogram also comprises determining if a time since the session key was sent to the user device by the server computer exceeds a threshold.

4. The method of claim 1, wherein the user device if a mobile phone.

5. The method of claim 1, wherein the Master Key is an ICC Master Key.

6. The method of claim 1, wherein the terminal is a POS terminal.

7. A server computer comprising:
   a processor; and
   a non-transitory computer readable medium, the non-transitory computer readable medium comprising code executable by the processor, for performing a method comprising:
   generating a session key based on a Master Key;
   transmitting the session key to a user device comprising a payment application, the payment application having a first state wherein the payment application is enabled to conduct a payment transaction, and a second state, different to the first state, wherein the user device generates an application cryptogram on the basis of the received session key, and provides the application cryptogram to a terminal after the terminal sends a cryptogram request to the user device;

receiving from the terminal, the application cryptogram in an authorization request for a transaction;

verifying the cryptogram by identifying the session key using the identified session key to verify the cryptogram; and responsive verifying the cryptogram, transmitting to the terminal, an authorization response.

8. The server computer of claim 7, wherein the server computer is an issuing bank server computer.

9. The server computer of claim 7, wherein verifying the cryptogram also comprises determining if a time since the session key was sent to the user device by the server computer exceeds a threshold.

10. The server computer of claim 7, wherein the application cryptogram is an ARQC.

11. The server computer of claim 7, wherein the method comprises:
transmitting another session key derived from the Master Key after transmitting the authorization response.

12. A method comprising:
generating, by a terminal in a transaction, a request for an application cryptogram;
transmitting, by the terminal to a user device, the request for the application cryptogram, wherein the user device comprises a payment application, the payment application having a first state wherein the payment application is enabled to conduct a payment transaction, and a second state, different to the first state, and wherein the payment application stores a session key generated using a Master Key;
receiving, by the terminal, the application cryptogram from the user device, the application cryptogram generated by the user device using the session key;
analyzing the application cryptogram to determine a cryptogram type; and
responsive to determining the cryptogram type, transmitting an authorization request comprising the application cryptogram to a server computer, wherein the server computer verifies the cryptogram by identifying the session key using the identified session key to verify the cryptogram.

13. The method of claim 12, wherein the user device is a mobile phone.

14. The method of claim 12, wherein the terminal is a POS terminal.

15. The method of claim 12, therein the Master Key is an ICC Master Key.

16. The method of claim 12, further comprising:
performing, by the terminal, a terminal action analysis, and then determining that that the transaction requires the application cryptogram.

17. The method of claim 12, wherein the second state is that the payment application is inoperative.

18. The method of claim 12, wherein the server computer verifies the cryptogram also by determining if a time since the session key was sent to the user device by the server computer exceeds a threshold.

19. The method of claim 12, wherein the server computer is an issuing bank server.

20. The method of claim 12, wherein the session key is usable to create only one application cryptogram for one transaction.

* * * * *